Feb. 13, 1962 J. M. BURCH 3,020,817
COPYING OF OPTICAL GRATINGS
Filed March 16, 1959 2 Sheets-Sheet 1
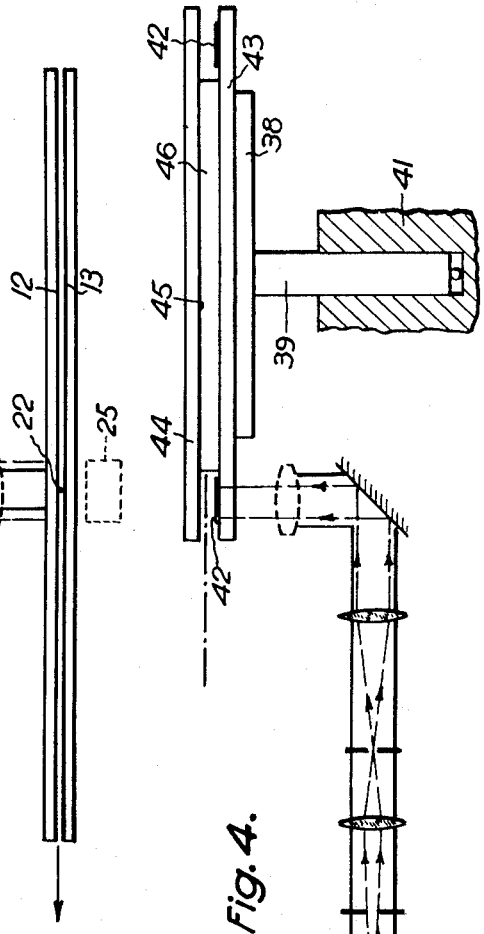
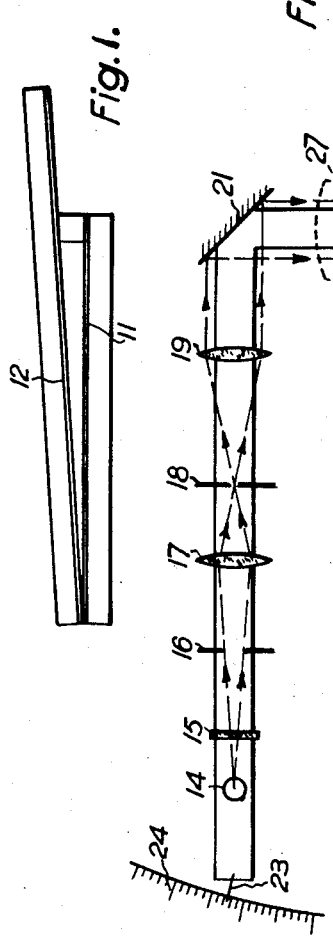
*INVENTOR*
JAMES MORRISS BURCH

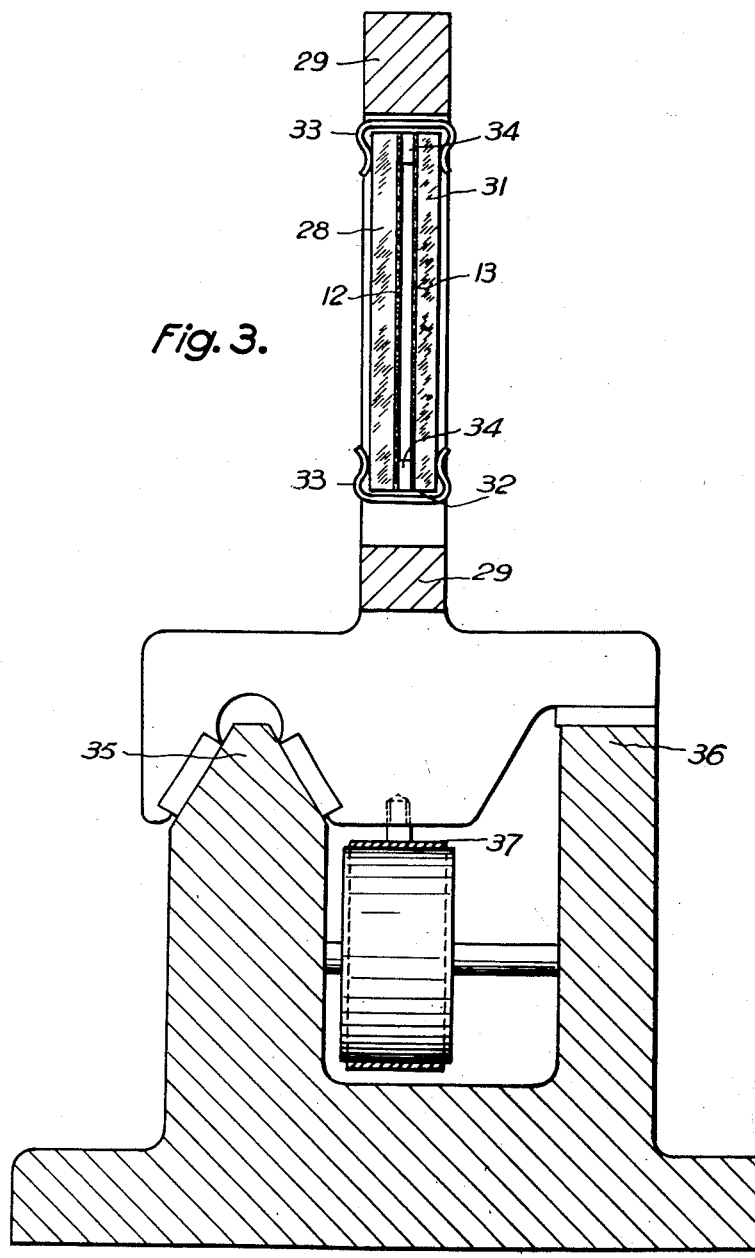

3,020,817
COPYING OF OPTICAL GRATINGS
James Morriss Burch, Surbiton, England
(% National Physical Laboratory, Teddington, England)
Filed Mar. 16, 1959, Ser. No. 799,625
Claims priority, application Great Britain Mar. 19, 1958
4 Claims. (Cl. 95—73)

This invention relates to the copying of diffraction gratings.

The invention is concerned with the production among others of copy gratings of considerable length such as are required and are suitable for measurements made by the moiré fringe technique. It is a matter of some difficulty to produce a long grating of the prismatic type since it has to be made up in short sections which have to be very precisely matched in phase when joined together. Once such a long grating has been made the invention enables copies to be produced from it photographically and the invention can be developed to enable known pitch errors in the prismatic grating to be corrected.

The invention is not limited to the copying of linear gratings but extends to the copying of radial gratings i.e. gratings in which the rulings are radial and spaced circumferentially round an annulus. Such gratings are required for example for subdividing the circle by the moiré fringe technique.

According to the invention the grating is copied by exposing behind it a sensitised surface and illuminating the grating by collimated monochromatic light, the spacing between the grating and the sensitised surface being approximately such that the zero order beam from one ruling meets the first order diffraction beams from the two adjacent or two neighbouring rulings at the sensitised surface.

It can be shown that in the case of a true bar and space grating this distance should be $nw^2/\lambda$ where $n$ is an integral number, $w$ is the spacing of the grating and $\lambda$ is the wave length of the light used while in the case of a phase grating it should be $n - \frac{1}{2}(w^2/\lambda)$.

If the grating is in relief it should be blazed as nearly as possible to divide the illumination equally between the zero order and one first order diffraction beam but higher order diffraction beams will always be present. Similarly even a nominally bar and space grating in practice produces phase effects. For these reasons the exact spacing between the grating and the sensitised surface is best determined experimentally to give optimal results.

It may here be mentioned that the tolerance which can be permitted in the spacing, if satisfactory results are to be obtained, is a fraction of the correct spacing being certainly not greater than $\pm w^2/8\lambda$. For spacings of the order of 5,000 or 6,000 per inch (2,000 or 2,400 per cm.) this tolerance is very small but it can be substantially increased by using light of two different wave lengths for the photographic exposure. If the respective wave lengths are $\lambda 1$ and $\lambda 2$ it can be shown that the tolerance can be increased by a factor of $$\frac{(\lambda 1 + \lambda 2)}{2(\lambda 1 - \lambda 2)}$$

which with for example the green and blue mercury lines 5461A. and 4358A. amounts to about 4. Since this method requires relative lateral displacement of the two light sources it is more convenient but not essential to effect the two exposures in sequence. This method is of greater interest in connection with asymmetric gratings.

Since it is a practical impossibility to provide a collimated beam with a cross section equal to the length or diameter of the grating a narrow beam is used which is traversed relative to the grating. Whether the beam remains stationary and the grating and sensitised surface move, or vice versa is a matter of convenience. In the case of a linear grating movement of the grating and sensitised surface avoids the problems which arise if the beam is moved, but involves a greater length of apparatus. In the case of a radial grating it is usually simpler to have a stationary beam and to move i.e. rotate the grating and sensitised surface.

If two gratings are available the apparatus according to the invention with the addition of a photoelectric cell and associated circuitry enables the gratings to be calibrated i.e. their progressive errors to be ascertained. The addition of a cylindrical lens also enables fan error which may or may not be progressive to be ascertained. The apparatus further enables the known errors where ascertained in this way or in other ways to be at least partially correct during the photographic exposure.

The invention will be further described with reference to the accompanying diagrammatic drawings in which, FIGURE 1 illustrates an arrangement for ascertaining by practical test the exact spacing between the grating and sensitised surface which should be used, FIGURE 2 is a plan view of the general arrangement of the apparatus for copying a linear grating, FIGURE 3 is a vertical section showing one arrangement for holding the grating and sensitised surface in the correct relationship in the case of a linear grating, FIGURE 4 is a vertical section showing one convenient layout of apparatus for copying radial gratings.

As above explained the appropriate spacing in any particular case between the grating to be copied and the sensitised surface can be calculated on the assumption that only the zero order and first order beams need to be considered but the exact spacing is best determined experimentally. As shown in FIGURE 1 a short sensitised surface 11 is arranged so that at one end it touches the grating 12 to be copied and at the other end is at a greater known spacing than will be necessary.

After exposure and development, by examining and testing the copy, that section of the length which is of the desired quality can be ascertained and from its position the exact spacing can be evaluated. As shown in FIGURE 2 the grating 12 and the sensitised surface 13 on their respective supports are mounted so that the space between them has the correct value. Light from a suitable source 14 such as a high pressure 125 watt MB mercury vapour lamp after passing through a filter 15 and field stop 16 is concentrated by a condenser 17 on to a slit 18 which serves as a source for a collimator 19 by which the grating 12 is illuminated. To obtain a more convenient layout a mirror 21 is interposed in the beam between the collimator and grating so that up to the mirror 21 the light beam extends parallel with the grating 12.

It is assumed that the beam remains stationary and that the grating and sensitised surface are traversed through the beam in the longitudinal direction of the grating. For example a screw feed may be used or an endless belt passing over two pulleys and rotated at a suitable speed for instance from an electric motor through gearing.

Having regard to the nature of the light source and the speed of the photographic emulsion the movement will be quite slow. By way of specific example with the above light source producing a beam ½ inch wide (12.5 mm.) from a slit 0.04 radian wide and using Kodak maximum resolution emulsion a speed of traverse of 2 inches (5 cm.) per minute is maintained and it may here also be mentioned that if the grating has a pitch of 2,500 lines per inch (1,000 lines per cm.) a suitable spacing between the grating 12 and sensitised surface 13 is 0.018 inch (0.46 mm.).

Since there is a space between the grating 12 and sensitised surface 13 it becomes possible by varying the inclination of the beam to the direction of traverse to correct any slight known progressive errors of the grating 12. This correction is to be obtained solely by change in inclination and not by lateral displacement of the beam in relation to the grating. It is essential therefore that the changes in inclination of the beam should be about a centre marked 22 which theoretically should lie in the surface of the grating 12 but which in practice may be within the space between the surface 12 and 13. The whole illuminating system can be mounted on a support pivoted about the centre 22 and may carry a pointer 23 working over an angular scale 24. Alternatively the rocking support may carry a reflector which reflects a beam of light from a stationary source upon an angular scale. This may make observation easier. Since as above explained in practical operation the rotation of traverse is slow, the angle of tilting being necessary to correct slight errors is such that can readily be effected manually. By way of example with a grating having 2,500 lines per inch (1,000 lines per cm.) and if the distance from the pointer 23 to the centre 22 is 1 metre, the movement of the pointer 23 through 1 inch (2.5 cm.) is approximately equal to one fringe of correction.

It should be mentioned that this method of correcting errors in spacing only deals with comparatively slow errors at intervals greater than the width of the light beam. In the case of moiré fringe applications it is only these errors which are of importance. If the moiré fringes are produced by the aid of an index grating of at least the same length as the width of the beam used in making the copy grating, the photoelectric cell upon which the fringes fall will average out more rapid errors.

If a second grating is available of the same periodicity as the grating to be copied, both gratings can be calibrated by mounting the second in the place to be occupied by the sensitised surface 13 and placing a photoelectric cell such as a cadmium sulphide cell, as indicated at 25 in FIGURE 2 to receive light coming through the two gratings from the same source 14 and associated optical elements as are used afterwards for the photographic exposure, and then measuring the light transmitted at various angles by a suitable circuit connected to the photoelectric cell. The principles underlying the calibration are in themselves well known, see for example "Dictionary of Applied Physics," Glazebrook, 1923 edition, volume 3, pages 254–5. By these means with a line spacing of 1,000 per inch (400 per cm.) a calibration which is reliable to within 5 microinches (125 micromillimetres) can be effected. The errors so ascertained can then be corrected as above described.

If as may be necessary in many cases the grating 12 itself is made up of several pieces end to end, even with the greatest care in phasing during assembly the errors at the junctions may be rather higher than elsewhere and show themselves in a form of sudden jumps. They can be ascertained during calibration and if desirable be separately corrected. Thus the two portions on either side of the joint may be provided with masks so that they can be exposed in two separate operations. After the first portion has been exposed, the printing frame is run back, the masks are changed, and the second portion is then exposed with the beam tilted by the necessary amount.

The correction just described is concerned with the line spacing of the gratings. They may also suffer from fan error i.e. variations in the angle between the lines and the length of the grating. To avoid fan error affecting calibration of the spacing, this calibration is effected with a photoelectric cell 25 responding only to a defined portion of each line so that the calibration of spacing is effected along a selected line say midlength of the grating lines. The fan error can be ascertained by mounting a cylindrical lens indicated at 27 in FIGURE 2 centrally in the beam reaching the grating, with its cylindrical axis parallel with the grating lines and setting the photoelectric cell 25 in a position in which the response is somewhere between maximum and minimum, say 50 percent. Slight rotation of the cylindrical lens will slightly change the orientation of the images falling on the cell and the rotation necessary at various points to maintain the output of the photoelectric cell constitutes a measure of the fan error. Instead of rotating the lens the measured output of the cell may be used. In carrying out this calibration the effect of error in line spacing must be allowed for or itself corrected by rocking the beam.

The second grating may be one of known fan error or of unknown fan error in which case the fan error of both gratings can be ascertained by the same type of analysis as applies in the case of line spacing calibration. By leaving the cylindrical lens in place and applying corresponding rotation during the photographic exposure correction of fan error in the photographic exposure can be effected.

If corrections are effected as above described the copy will then be more accurate than the grating itself and as it can itself be copied again by photography only one or at most a few copies of the grating itself are usually needed and manual correction is therefore adequate. But if for any reason many copies are to be made it may be worth while arranging for rocking of the beam about the centre 22 and the rotation of the cylindrical lens to be effected by respective cam bars shaped according to the calibration of the grating and moved by the same mechanism which effects traverse.

It will be clear that accurate positioning of the grating 12 and surface 13 and smooth, steady movement are essential if a satisfactory copy is to be made. The grating 12 and surface 13 will usually be on glass supports though if the long-term stability of glass is considered insufficient the support of the surface 13 can be made of silica. With the considerable length in relation to thickness of the two supports care must be taken in mounting to avoid transverse flexure which would alter the spacing. As shown in FIGURE 3 the support 28 of the grating 12 may be located kinematically at 6 points in a strong metal frame 29. The support 31 for the sensitised surface 13 rests on a carefully prepared surface 32 in the frame 29 and it is held at the correct spacing from the support 28 by light clamps 33 placed at intervals of say 6 inches (15 cm.) spacers 34 being interposed between the supports 28, 31 in line with the pressure of the clamps. It is found that this arrangement imposes no perceptible flexure on the two supports. In order to render the longitudinal movement of the frame 29 smooth it is supported on V and flat ways indicated at 35, 36, the motion being steadied by the use of an oil of suitable consistency between the mating surfaces. The movement may be produced as above described by a screw feed or an endless belt 37 passing over pulleys, the screw or one of the pulleys being driven through reducing gearing from a constant-speed electric motor.

For the same reasons it is also desirable to provide protection against rapid temperature variation and localized temperature variations.

In applying the invention to the copying of radial gratings a turn table 38 is provided arranged accurately normal to the axis of a shaft 39 accurately journalled in a bearing 41. Any convenient means not shown is provided for rotating the shaft 39 at a slow steady speed for instance a constant speed electric motor. On this turn table is mounted the grating 42 to be copied which occupies an annulus on a circular support 43 the grating being carefully centered on the axis of the shaft 39. As shown the turn table 38 has a smaller diameter than the internal diameter of the grating so that it can be opaque and of metal but it might be transparent and of the same diameter as the support 43. A support 44 carrying a sensitised surface 45 is mounted on the support 43 with a central circular spacing washer 46 of the required thickness and if necessary light clamps may be used to prevent any risk of relative movement between the supports 43, 44. The appropriate thickness of the spacer 46 may be ascertained as above described with reference to FIGURE 1.

Similar to the arrangements described with reference to FIGURE 2 an intense beam of collimated monochromatic light derived from a source 47 is directed upwardly through the grating 42 on to the surface 45. It illuminates only a narrow sector of the annulus occupied by the grating, for example 3° wide. The exposure is made by rotating the whole table slowly until an exact number of revolutions has been made between the opening and closing of the shutter so that each part of the photograph is equally exposed.

Similar to the correcting arrangements above described with reference to FIGURE 2 the beam projecting system may be arranged so that it can rock about an axis lying in the plane of the drawing perpendicular to the axis of the shaft 39 and located as close as possible to the surface 45. The grating 42 can then be calibrated in a manner similar to that described above with reference to FIGURE 2 and the progressive errors can be corrected during exposure in a similar manner. This procedure eliminates only the slow progressive errors, in this example those which recur at a period of 3° or more. If the copy grating is required for moiré fringe applications this is satisfactory because only these slow errors are objectionable. If the corrected copy is used to produce moiré fringes in combination with an index grating which is itself 3° wide then the photoelectric cell used for reading the fringes automatically averages out the rapid period errors. Fan error in the radial grating can also be corrected by a similar method to that above described for a linear grating.

It will generally be desired that the photographic copy should be of sinusoidal optical profile and to assist in achieving this, the illuminated slit or pin hole which serves as the light source should not be too narrow or small. Then higher harmonics are blurred out. The same result is also assisted by using an emulsion with a resolving power only just sufficient to resolve the wanted periodicity.

The photographic copy made as above described may itself be copied photographically in the same manner that is to say using a collimated monochromatic beam and a sensitised surface spaced behind the copy, the spacing again being conveniently ascertained experimentally.

Where a silver bromide emulsion is used for producing the photographic copies, since the quantity of silver present in the image is proportional to the density, the emulsion itself will have a sinusoidal relief. It is moreover possible to enhance this relief by methods already known in the photographic art for example in the collotype process. It is therefore possible to provide from this photographic copy tertiary replicas by moulding a transparent cold-setting synthetic resin against the photographic copy by methods such as those described in United States application, Serial No. 540,590 filed October 14, 1955, now abandoned. Such replicas have high stability and they are very suitable for making measurements by the moiré fringe technique. The symmetrical corrugation means that good fringe contrast is obtained over a wide range of visible and infra red wave lengths, even when the replica in the case of a linear replica is reversed left for right as is sometimes desired in the visual analysis of ruling errors. The errors due to the double replication are very small indeed. If such tertiary linear replicas are aluminised for spectroscopic purposes, they are less efficient than an optimally blazed ruling but they have the advantage of freedom from scattered light.

If a further photographic copy is to be made from the first photographic copy, as above mentioned a collimated monochromatic beam is used and the sensitised surface is spaced from the copy, though since the nature of this copy is different from that of the prismatic grating, the spacing will also need to be different and its best value is most easily ascertained experimentally. Even if the first copy has been corrected as above described, it may be calibrated for progressive error and for fan error, and further corrections be effected in making the second copy. As the spacing between the copy and the sensitised surface will be different, the angular rate of correcting movement of the beam for line spacing correction will be different but can readily be calculated. In any case the scale of angular movement can be checked by replacing the processed copy into position in relation to the grating or copy from which it was made to form moiré fringes and comparing the travel of the fringes with the movements of the end of the support for the beam-forming means.

What is claimed is:

1. In a method of copying an optical grating photographically by exposing behind the grating a sensitised surface fixed in relation thereto and traversing the grating relative to a collimated beam of monochromatic light of smaller cross section than the grating, the spacing between the grating and the sensitised surface being approximately such that the zero order beam from one ruling meets the first order diffraction beam from two neighbouring rulings at the sensitised surface, the steps which comprise previously ascertaining the spacing errors of the grating and varying the inclination of the collimated beam about a centre lying in the axis of the collimated beam and within the space between the grating and the sensitised surface, during the traverse to correct the ascertained spacing errors in the grating.

2. A method according to claim 1 in which the step of ascertaining the errors in spacing comprises placing a second grating of the same periodicity in the place to be occupied by the sensitised surface and measuring by means of a photoelectric cell the light transmitted at various angles by the grating when illuminated by the collimated beam afterwards to be used for the photographic exposure.

3. In a method of copying an optical grating photographically by exposing behind the grating a sensitised surface fixed in relation thereto and traversing the grating relative to a collimated beam of monochromatic light of smaller cross section than the grating, the spacing between the grating and the sensitised surface being approximately such that the zero order beam from one ruling meets the first order diffraction beam from two neighbouring rulings at the sensitised surface, the steps which comprise previously ascertaining the fan errors of the grating and oscillating about the axis of the collimated beam a cylindrical lens included in the collimated beam with its axis optically parallel with the grating lines, during the traverse to correct the ascertained fan errors in the grating.

4. A method according to claim 3 in which the step of ascertaining the fan error comprises placing a second grating of the same periodicity in the place to be occupied by the sensitised surface, mounting a cylindrical lens in the beam with its cylindrical axis optically parallel with the grating lines and measuring the rotation of this lens about the axis of the beam necessary at various points to maintain the output of a photoelectric cell placed to receive the beam coming through the two gratings.

References Cited in the file of this patent
UNITED STATES PATENTS
2,451,164     Grimson _____ Oct. 12, 1948